United States Patent [19]

van Brederode

[11] 4,012,461

[45] Mar. 15, 1977

[54] PROCESS FOR PREPARING POLYMER POWDERS

[75] Inventor: Robert A. van Brederode, Baytown, Tex.

[73] Assignee: Exxon Research and Engineering Company, Linden, N.J.

[22] Filed: Aug. 6, 1975

[21] Appl. No.: 602,211

[52] U.S. Cl. .............................. 260/878 R; 264/8; 264/12; 264/13; 528/497; 528/498; 528/501; 528/503

[51] Int. Cl.[2] .................. C08F 6/10; C08F 255/02; C08J 3/12

[58] Field of Search ..... 260/93.7, 94.9 F, 94.9 GC, 260/94.9 GD, 878 R; 264/8, 12, 13; 528/497, 498, 501, 503

[56] References Cited

UNITED STATES PATENTS

| | | | |
|---|---|---|---|
| 3,119,801 | 1/1964 | Haskell | 260/94.9 GD |
| 3,244,687 | 4/1966 | Spindler | 260/94.9 GD |
| 3,306,342 | 2/1967 | DiSalvo et al. | 264/12 |
| 3,563,975 | 2/1971 | Zavasnik | 260/94.9 F |
| 3,743,272 | 7/1973 | Nowotny et al. | 260/94.9 GD |
| 3,849,516 | 11/1974 | Plank | 260/878 R |
| 3,862,265 | 1/1975 | Steinkamp et al. | 260/878 R |
| 3,882,095 | 5/1975 | Fowells et al. | 260/94.9 F |
| 3,891,499 | 6/1975 | Kato et al. | 264/13 |
| 3,896,196 | 7/1975 | Dickey et al. | 264/13 |

*Primary Examiner*—Alan Holler
*Attorney, Agent, or Firm*—David A. Roth

[57] ABSTRACT

A process for producing fine polymer powders which comprises dissolving 1 to 40 weight percent of a polymer in a solvent at a temperature in the range of 90° to 165° C under autogenous conditions, cooling the solution to a temperature to precipitate the polymer and to leave in solution an amount of polymer less than that which will inhibit the formation of droplets upon atomization of the solution into a drying zone, said cooling being carried out under agitation conditions of high shear, to produce a slurry of particulate polymer and solvent, atomizing said slurry into a vaporization zone, feeding a drying gas into the vaporation zone at a temperature in the range of 90° to 160° C, recovering the partially dry polymer particles, drying the particles and recovering a polymer powder of less than 100 micron size.

18 Claims, 4 Drawing Figures

PROCESS FOR PREPARING POLYMER POWDERS

BACKGROUND OF THE INVENTION

This invention relates to the preparation of finely divided normally solid, synthetic organic polymeric thermoplastic resins.

Thermoplastic polymers in powder or finely divided form have a wide variety of commercial applications, such as for example, the dry powders have been used to coat articles in dry form by dip coating in either static or fluidized beds, by electrostatic coating, spraying, or dusting and flame spraying. The powders are used in dispersed form in suitable liquid carriers to apply coatings by roller coating, spray coating, and dip coating to a variety of substrates such as, glass, ceramics, metal, wood, cloth, paper, paperboard, and the like. The finely divided polymers have also been successfully employed in conventional powder molding techniques. The fine powders have also been applied as paper pulp additives, mold release agents, wax polish, paint compositions, binders for non woven fabrics and finishes for woven fabrics.

There are basically four types of processes employed in the prior art for preparing finely divided polymer particles, i.e., mechanical grinding, solvent precipitated, dispersion and spray atomization of solutions or slurries.

Generally mechanical grinding employs conventional equipment to yield particles of irregular shape and wide size variation of from about 75 to 300 microns. The powders produced by this method may not be suitable for applications where free flowing powders are required, since the irregular shapes may inhibit the flowability of these powders. The grinding of some polymer may be very costly because of the toughness of the resin even when cryogenically cooled.

The spray techniques are generally satisfactory for producing uniform non-agglomerated spherical particles, however very specialized equipment, usually nozzles operating under a limited range of conditions to prevent nozzle plugging are required. Substantial problems in spraying are the shearing of a polymer solution as it passes through the nozzle, premature precipitation of the polymer or too rapid volatilzation of solvent.

The dispersion method also is subject to high shear conditions. Frequently water is the dispersing medium and dispersing agents are used to facilitate the dispersion. Hence the powders produced by this technique generally incorporate some or all of the dispersing agent in the powder which can create undesirable changes in the original polymer properties, e.g., increased water sensitivity, loss of electrical insulating values, loss of adhesive capabilities, etc.

The final type of prior art process generally entails dissolving the polymer in a solvent, followed by precipitation of the polymer in finely divided form through addition of a nonsolvent, evaporation of the solvent or a combination of the two. Problems in this process have included difficulty in manipulating the solvents, solvent removal, particle agglomeration which requires a great deal of grinding, and particles having irregular somewhat rounded shapes.

The solvent system method, however, is a relatively simple procedure for producing powders for many applications and there are a number of patents, relating to improvements. For example, U.S. Pat. No. 3,563,975, which discloses the preparation of high density polymer powders by cooling a hot solution of polymer under sufficient pressure to prevent substantial vaporization of the solvent. The patentee recognized that shear stress occurring just before the polymer is precipitated, cause polymer strings. To prevent this undesirable occurence an elongated cooling means was devised to precipitate polymer particles. The elongated cooling means operated with intermittent high velocity movement of material therethrough, which resulted in very little turbulence.

In another process described in British Pat. No. 1,172,317 particulate powder was precipitated in a quiescent solution to avoid shear stresses and the resultant polymer strings.

Both of these processes are primarily dependent on non-turbulent precipitation of solutions during cooling, which substantially enhanced the problem of heat removal. An agitated precipitation would be far easier to cool and hence would require simplier equipment and techniques and less time and expense than those of the prior art.

DRAWINGS

SUMMARY OF THE INVENTION

Figure 1:
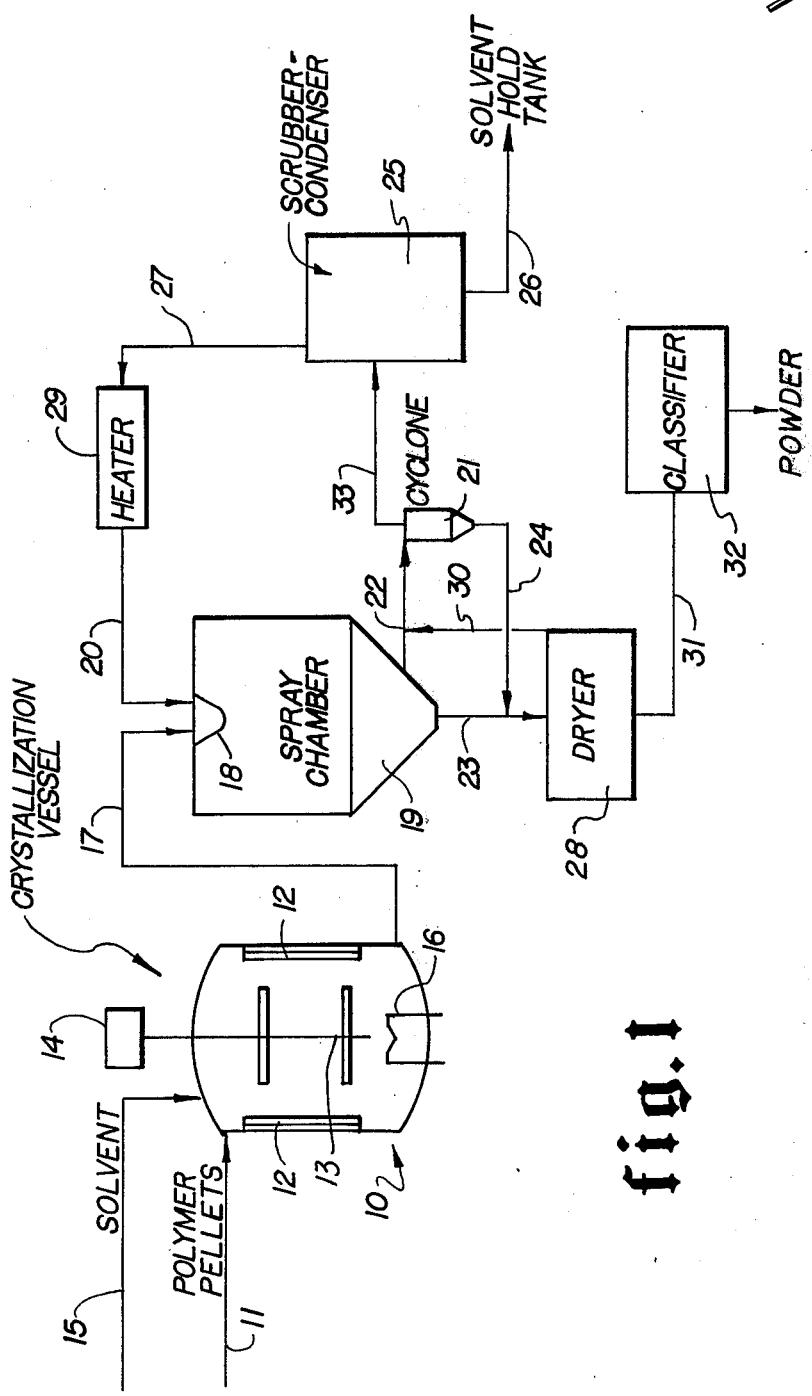
FIG. 1 is a schematic representation of the process of the present invention.

Briefly stated the present invention is a process for preparing fine powders of thermoplastic polymers by dissolving 1 up to 40 weight % of polymer, preferably at least 5 weight % in a solvent at a temperature in the range of 90° preferably greater than 100° C to 165° C, preferably 140° C under autogenous pressure cooling the solution with high shear agitation to a temperature below 90° C under autogenous pressure, while precipitating (or crystallizing) said polymer, to produce a slurry of particulate polymer and solvent, which is atomized into a vaporization zone into which a gas at 80° to 180° C preferably 90° to 160° is being fed, and recovering said polymer particles, having a substantial portion of the solvent removed therefrom.

The agitation is quite important and may be achieved by the use of an agitator of a particular configuration as described below in detail. The agitation improves heat transfer and facilitates cooling the solution, thereby increases the rate of precipitation.

DETAILED DESCRIPTION OF THE INVENTION

In general the polymers suitable for the practice of the present invention include any normally solid synthetic organic polymeric thermoplastic resin whose decomposition point is somewhat higher than 100° C. Included are polyolefins, vinyls, olefin-vinyl copolymers, olefin-allyl copolymers, polyamide acrylics, polystyrene, cellulosics, polyesters, and polyhalocarbons.

Generally the most suitable polyolefins for use in the present process include normally solid polymers of mono-alpha-olefins, which comprise from 2 to 6 carbon atoms, for example, polyethylene, polypropylene, polybutene, polyisobutylenes, poly-(4-methylpentene-1), copolymers of these various alpha-olefins and the like.

Vinyl polymers suitable for use herein include polyvinyl chloride, polyvinyl acetate, vinyl chloride/ vinyl acetate copolymers, polyvinyl alcohol and polyvinyl acetal.

Among the suitable olefin-vinyl copolymers are ethylene-vinyl acetate, ethylene-vinyl propionate, ethylene vinyl isobutyrate, ethylene-vinyl alcohol, ethylene-methyl acrylate, and the like. Olefin-allyl copolymers include ethylene-allyl alcohol, ethylene allyl acetate, ethylene-allyl acetone, ethylene-allyl benzene, ethylene-allyl ether, and the like.

Examples of some specific acrylic polymers are polymethyl methacrylate, polyacrylonitrile, poly-methylacrylate and polyethylmethacrylate. The polyamides suitable for use include polyhexamethylene adipamide, polyhexamethylene sebacamide, and polycaprrolactam.

The present process is also useful for preparing powders from solutions of mixtures of thermoplastic polymers such as ethylene vinyl acetate/polyethylene, polyethylene/polypropylene, and the like.

The present process may also be used to produce powders from a solvent reaction system wherein the polymeric material is prepared in a solvent system, such as for example the alpha-olefin polymers, as described in numerous patents such as U.S Pat. Nos. 2,112,300; 3,113,115; 3,197,452; Belgian Pat. No. 538,782 and British Pat. No. 994,416. Catalysts are the now well known "Ziegler" variety.

POLYMER CATALYSTS AND PROCESSES

The catalyst is normally prepared from a transition metal compound, preferable a halide, and a reducing component consisting normally of aluminum metal or a metal alkyl compound. Representative of the transition metal compounds used is a metal selected from Groups 4B, 5B, and 6B of the Periodic System.* Included in the preferred species are the titanium halides, for example, titanium tetrachloride, titanium trichloride, and titanium dichloride, and mixtures thereof. Other metal compounds such as zirconium tetrahalide and hafnium tetrachloride, vanadium chloride, chromium chloride, tungsten chloride, and the like, are especially useful. Still other transition metal halides containing halogens selected from the group consisting of bromine, iodine, chlorine, and in certain instances fluorine, can also be used.
*Handbook of Chemistry and Physics, The Chemical Rubber Co., Cleveland, Oh., 45th Edition, 1964, p. B-2.

The reducing component of the catalyst composition may be any of a variety of reducing agents. Most common among the reducing agents are the organometallic compounds such as triethyl aluminum, aluminum diethyl chloride, aluminum ethyl dichloride, aluminum diethyl hydride, aluminum triisobutyl, aluminum triisopropyl, and related compounds. Many other reducing agents such as lithium aluminum hydride, zinc ethyl hydride, and the like are described in the literature as useful reducing agents and can also be used. These catalysts are all of the now well known "Ziegler" variety.

Certain ziegler catalysts, or more particularly, certain modified Ziegler catalysts, have been found to be especially useful for polymerizing alpha-olefins. For example, a titanium trichloride catalyst modified with aluminum chloride having the formula, $TiCl_3 \cdot \frac{1}{3}AlCl_3$. Normally, this modified Ziegler catalyst is activated with a metal alkyl such as an aluminum alkyl, and preferably with an aluminum alkyl halide having the structural formula, $R_2AlX$ or $R_3Al_2X_3$, wherein R is selected from the group consisting of alkyl radicals containing 1 to 12 carbon atoms or phenyl or benzyl radicals, and X is a halogen atom selected from the group consisting of chlorine, bromine or iodine.

A variety of monomers may be polymerized with the Ziegler type catalysts. Any unsaturated hydrocarbon corresponding to the general formula $R-CH=CH_2$, wherein R is selected from the group consisting of an alkyl radical having from 1 to 6 carbon atoms, a phenyl radical, or an alkyl substituted phenyl radical can be used. Examples of specific unsaturated hydrocarbons which can be polymerized include alpha-olefins containing 3 to 8 carbon atoms, such as propylene, butene, isobutylene, pentene, isoamylene, hexene, isohexenes, heptene, isoheptenes, octene, isooctenes, and the like.

The preferred catalyst composition for the polymerization of propylene comprises a modified titanium trichloride having the structural formula, $TiCl_3 \cdot \frac{1}{3}AlCl_3$, activated with diethyl aluminum chloride. Ratios of diethyl aluminum chloride and titanium trichloride of between 0.3:1 and 6:1 may be advantageously used. The presence of an alkali metal halide in an amount of between 0.5 to 10 mols of an ankali metal halide per mol of reduced titanium tetrahalide, and preferably a mol ratio of from 0.8 to 5 mols of an alkali metal halide, such as sodium chloride, per mol of reduced titanium tetrahalide can be used for improving catalyst activity.

The monomers may be polymerized at moderate temperatures and pressures with the Ziegler type catalysts described above, generally at temperatures of 0° to 150° C, with temperatures on the order of 25°to 80° C being particularly useful. A solvent such as a paraffin or cycloparaffin having 3 to 12 carbon atoms, may be employed for the polymerizations, however, the olefin monomer is frequently used for this purpose. The polymerizations are preferably conducted under conditions that exclude atmospheric impurities such as moisture, oxygen and the like.

The pressure ranges from about atmospheric pressure to about several atmospheres with pressures in excess of about 500 p.s.i. rarely being employed.

After the polymer has been produced, the catalyst is deactivated by contacting the polymeric reaction mixture with a material which reacts with and deactivates the catalyst. Such materials include, for example, lower alcohols, acetone and water.

The term polyolefins includes those materials modified with materials such as the unsaturated organic acids, for example, maleic acid, muconic acid, dimethyl muconic acid, acrylic acid, methacrylic acid, vinyl acetic acid, and the like. Generally the polyolefins may be modified by from 1 to 10 weight percent of the unsaturated acid. The modification has been observed to improve the surface adhering characteristics of the polyolefin polymers when they are employed as surface coating, particularly the alpha-olefins, such as polypropylene. The modifying unsaturated acids may be incorporated into the polyolefins by intimately contacting the modifier with the polyolefin in a melt or solution of the polymer in the presence of a free radical source, such as an organic peroxide or by copolymerization with another monomer followed by neutralization or partial neutralization to yield an ionomer, if desired.

In the process of the present invention it is possible to employ graft polymers prepared by known methods in the art, e.g., those to be found in U.S. Pat. Nos.

3,177,269; 3,177,270; 3,270,090; 3,830,888; 3,862,265; British Pat. Nos. 1,217,231; 679,562 and the like.

The preferred modifying monomers which are grafted to the backbone are $C_3$ to $C_{10}$, preferably $C_3$ to $C_6$ unsaturated mono- and polycarboxylic-containing unsaturated acids with preferably at least one olefinic unsaturation, anhydrides, salts, esters, ethers, amides, nitriles, thio, glycidyl, cyano, hydroxy, glycol, and other substituted derivatives thereof.

Examples of such acids, anhydrides and derivatives thereof include maleic acid, fumaric acid, itaconic acid, citraconic acid, acrylic acid, glycidyl acrylate, cyano ethyl acrylate, hydroxy ethyl methacrylate, acrylic polyethers, acrylic anhydride, methacrylic acid, crotonic acid, isocrotonic acid, mesaconic acid, angelic acid, maleic anhydride, itaconic anhydride, citraconic anhydride, sodium acrylate, calcium acrylate, magnesium acrylate and the like.

Other monomers which can be used either by themselves or in combination with one or more of the carboxylic acids or derivatives thereof include $C_8$ to $C_{50}$ vinyl monomers such as monovinyl aromatic compounds, i.e. styrene, chlorostyrenes, bromostyrenes, alpha-methyl styrene and the like.

Other monomers which can be used are $C_8$ to $C_{50}$ vinyl esters and allyl esters, such as vinyl butyrate, vinyl laurate, vinyl stearate, vinyl adipate and the like, monomers having two or more vinyl groups, such as divinyl benzene, ethylene dimethacrylate, triallyl phosphite, dialkylcyanurate and triallyl cyanurate.

The process of the present invention is especially useful for grafted polymers prepared by grafting a polymer of a $C_2$ to $C_8$ mono-$\alpha$-olefin or its copolymers with acrylic acid in a special process. The polymers of $C_2$ to $C_8$ mono-$\alpha$-olefinsj are commonly referred to as polyolefins and for the purpose of this invention are to include copolymers of the $C_2$ to $C_8$ mono-alpha-olefins with each other and with other monomers as well as the homopolymers.

Polymers containing diolefins such as butadiene and isoprene are also suitable. The polyolefins are produced utilizing in most instances a Ziegler-type catalyst, but can also be Phillips catalysts and high pressure technology.

Examples of suitable polyolefins, both plastic and elastomeric, include low or high density polyethylene, polypropylene, polybutene-1, poly-3- methylbutene-1, poly-4-methylpentene-1, copolymers of mono-olefins with other olefins (mono-or diolefins) or vinyl monomers such as ethylene-propylene copolymers or with one or more additional monomers, i.e. EPDM, ethylene/butylene copolymer, ethylene/vinyl acetate copolymer, ethylene/ethyl acrylate copolymer, propylene/4-methylpentene-1 copolymer and the like.

The term "copolymer" includes two or more monomer constituents and substituted derivatives thereof.

The preferred polyolefins employed in the present invention contain propylene and/or ethylene, i.e. polypropylene and polyethylene. The starting polymer used as a base material in the graft process will preferably have a melt index (MI) (ASTM D-1238-65T) of 1 to 40, preferably 5 to 40, and most preferably 5 to 10, or melt flow rate (MFR) between about 0.1 to 50 and preferably 0.5 to 10, most preferably 2 to 5. These melt flow rates correspond approximately to viscosity average molecular weights of about 100,000 to 500,000.

The preferred monomers to be grafted to the $C_2$ to $C_8$ polyolefin and other polymers for use in the present invention are maleic anhydride, acrylic acid, methacrylic acid, glycidyl acrylate, hydroxy ethyl methacrylate and their derivatives. Others that can be used are described elsewhere herein. However, other monomers may be added in admixture with these such as maleic anhydride (MA), styrene, acid esters, salts and the like to form graft copolymers. MA and styrene and MA and acrylic acid are preferred over MA alone when polymer grafts of MA are desired.

The grafting reaction is initiated by a free-radical initiator which is preferably an organic peroxygen compound. Especially preferred peroxides are t-butyl per benzoate, dicumyl peroxide, 2,5-dimethyl-2,5-di-tert-butylperoxy-3 hexyne (Lupersol 130), alpha, alpha'-bis (tert-butylperoxy) diisopropyl benzene (VulCup R or Percadox 14), or any free radical initiator having a 10-hour half-life temperature over 80° C. or mixtures thereof. Generally, the higher the decomposition temperature of the peroxygen compound, the better. See pp 66–67 of *Modern Plastics*, November 1971, which is incorporated hereby by reference, for a more complete list of such compounds.

The free radical initiator is used in amounts corresponding to 0.005 to 5, preferably 0.02 to 2, most preferably 0.02 to 1.0 weight percent based on monomer. When based on polymer, free radical initiator is used in amounts of 0.0001 to 1, preferably 0.001, and most preferably 0.001 to 0.5 weight percent.

The monomer to be graft polymerized is used in amounts of 0.01 to 100, preferably 0.05 to 50, and most preferably 0.1 to 25 weight percent of the base polymer.

Generally, the monomer and initiator are blended together and added simultaneously, except in the situation of a polyethylene or ethylene predominant copolymer. Illustrative of the graft preparation is the grafting of acrylic acid onto polypropylene. Molten polypropylene is contacted with acrylic acid at 350° to 650° F, preferably 400° to 550° F in the presence of a peroxide initiator. The initiator and acrylic acid are added as a liquid blend. The resulting graft copolymers have been appreciably degraded and changed in molecular weight as compared to the base polymer. The solvents employed are preferably paraffins or cycloparaffins having 5 to 12 atoms. Suitable solvents include n-pentane, isopentane, n-heptane, isooctane, cyclohexane, methylcyclohexane, nonane, and the like or mixtures of solvents. The solvent will generally contain from about 1 to 40 weight percent, more preferably about 5 to 20 weight percent of polymer based on the total weight of the solution.

About 15 weight % of the polymer is dissolved in the solvent, for example n-heptane, by heating at 100° to 140° C. preferably in the range of 110° to 130° C. under autogenous pressure for 5 minutes to 2 or more hours, typically about 1 hour. Preferably the temperature is selected to maintain the pressure in the autoclave at less than 100 psig more preferably less than 75 psig. more preferably less than 50 psig.

The slurry is produced by cooling the solution, to a temperature below 90° C. Polymer precipitation begins at about 90° C and continues as the temperature is lowered, at a rate of 1 to 10° C/minute preferably about 5° C/minute. The temperature of the solution is lowered to about 50° C. Lower temperatures may be used but are not necessary, similarly temperatures from 20°

C up to about 80° C are suitable for the final slurry temperature. It is readily apparent that at temperatures above 20° C, somewhat larger amounts of polymer will remain dissolved in the solvent, unless long precipitation periods are provided. In any event it is necessary to keep the residual polymer, which is dissolved in solution, below the concentration which will produce strings as the solvent is atomized along with slurry particles. This is discussed in detail in the copending application of Robert A. van Brederode and Joseph C. Floyd Ser. No. 602,212 filed of even date herewith. It is disclosed in that case that up to a critical amount of polymer may be present in solution in the solvent without the formation of strings as the solvent is atomized into a vaporization zone where the solvent is partially vaporized.

Thus since it is desirable, and one of the objects of the present invention is to remove solvent from the slurry particles, operation of the present process should be carried out such that there is less than that amount of the polymer remaining in solution in the solvent than will inhibit formation of droplets at the drying zone temperature. The amount of polymer which may remain in solution in a solvent which has a vapor pressure of 50 to 400 mm of mercury at the temperature of the drying zone is that amount which produces a viscosity in the solvent of no greater than 5 centipoise at the temperature of atomization. The particular lower or final precipitation temperature will have to be determined for each solvent and polymer employed to achieve this result. This can be easily done by those of ordinary skill or may be available in standard technical and engineering tables in regard to some combinations. Lengthened precipitation periods may also be used to remove larger amounts of polymer from solution at a given temperature.

The cooling and precipitation is conducted in an agitated solution. As noted above this aids cooling and speeds precipitation. However, the nature of the agitation is quite critical. The prior art believed that shearing of solution encouraged the formation of polymer strings and thus sought to avoid all agitation to prevent this undesirable result. However, surprisingly it has been found that high shear does not result in strings.

Figure 3:
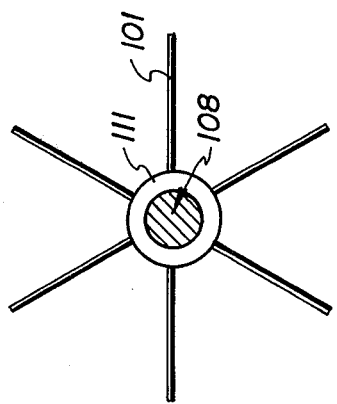
FIG. 3 is a diagrammatic top view of the upper turbine of the vessel of FIG. 2.
Figure 2:
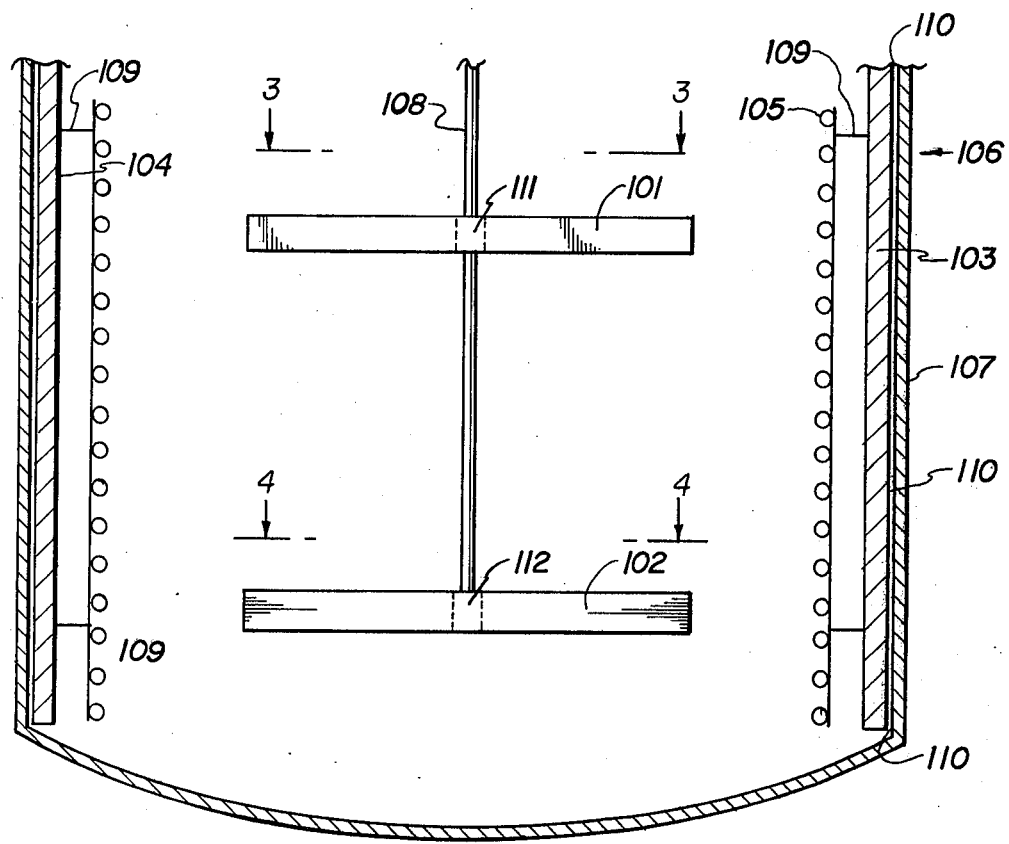
FIG. 2 is a diagrammatic crystallization vessel useful for the present process.
Figure 4:
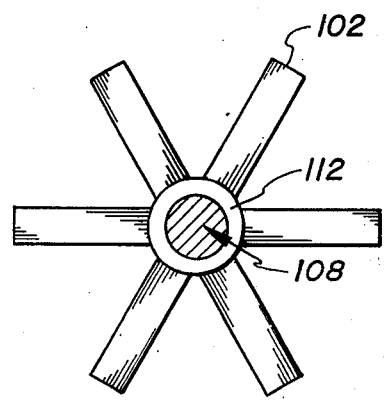
FIG. 4 is a diagrammatic top view of the lower turbine of the vessel of FIG. 2.

The apparatus used in the present process to obtain high shear is shown in FIG. 2. It is a vessel which is fully baffled. Turbine agitators, typically ⅓ to ⅔ the diameter of the vessel have been used, operated with good results at from 20 to 300 rpm's. Satisfactory high shear agitation can be obtained with paddle diameter of from 30 to 80 percent of the internal diameter of the vessel. FIGS. 3 and 4 show a top view of the turbines in FIG. 2.

The degree of shearing necessary to carry out the process is less than that which would be achieved if an emulsion were produced. Emulsion of the precipitated polymer would be too high a shear and is to be avoided. Thus the present shearing may be described as less than that necessary to produce an emulsion of polymer particles in the solvent, but by conventional chemical engineering practice the agitation is intense as measured by energy input per unit volume of liquid.

The precipitated particles form a slurry in the precipitation vessel. This slurry is removed (by gravity, pumping, pressure, screw, etc.) and atomized through a conventional nozzle or centrifugal atomizing wheel such as a provided by Niro atomizer into a vaporization zone, into which a drying gas is being fed at a temperature of 80° to 160° C., depending on the polymer and solvent, to produce powder particles leaving the vaporization zone at temperatures generally in the range of 30° to 50° C. and having about 5 to 30 weight percent solvent still associated therewith. The damp powder is then dried to completion, for example by fluidized bed, vibrating tray, tumbling or the like.

The vaporizing gas may be air, however, explosive mixtures may result with the powder. Preferably inert gases such as nitrogen, $CO_2$, or helium are employed.

Generally the particles produced according to this method have a size of less than 100 microns, usually over 90% of the particles are less than 75 microns.

Some powder, for example, propylene resins (polypropylene, ethylene propylene copolymers, blends of propylenes with ethylene propylene rubber and high density polyethylene and acrylic acid grafted modifications thereof having melt flow rates of 2 to 80) tend to be made of 20 to 30% agglomerates as taken from the vaporization zone, with the remainder being less than 100 microns, e.g., less than 74 microns; the average size being about 30 microns.

The agglomerates are readily reduced to finer powder by attrition, for example, by impingement mill (particle on particle) or pin mill, such that the yield of particles of less than 100 microns approaches 99% or more. The milled agglomerate particles are irregularly spherical, but not sharply angular or elongated as with grinding.

The usual particle size in the absence of agglomeration is less than 100 microns, however, the powders are usually classified to remove any oversized particles, e.g., agglomerates, scale, trash, etc. and to separate the powders for different uses.

It has also been found that additives such as stabilizer, antioxidants, coloring agents and the like may conveniently be added to the solution of polymer, before or during precipitation and slurry stages, or during or after the drying step. Soluble or dispersible additives are very evenly distributed throughout the powders.

FIG. 1 represents schematic embodiment of apparatus which could be employed to carry out the present process. A vessel 10 adapted for autogenous pressure is equipped with paddle 13 operated by a motor 14 and having baffles 12. Conduit 11, which may be a screw conveyor is provided to feed solid polymer, usually as pellets into the vessel 10. Line 15 is provided for solvent entry. A heat exchange means 16 is provided in the vessel 10. The following description shall be given in regard to a batch operation, however, the present process may be carried out by continuous and semicontinuous operation.

The solid polymer pellets are fed via conduit 11 and the solvent is fed through line 15 in the desired ratios into vessel 10. It should be appreciated that the functions to be described in vessel 10 may be carried out in separate vessels, with the same result, e.g., dissolution, crystallization and precipitation. The polymer is heated by 16 to a temperature in the range of 90° to 140° C and stirred to dissolve the polymer. The heating is discontinued and the solution cooled while paddle 13 is rotated at 30 to 300 rpm's preferably about 200 to 300 rpm's. If desired heat exchanger 16 may be used to cool vessel 10.

The cooling and agitation is continued until the predetermined temperature at which less than that critical amount of polymer is left in solution that otherwise would result in strings and fibers. The remainder of the polymer is crystallized and precipitated to form a slurry in the vessel 10. The slurry is removed from vessel 10, for example by pumping via line 17 into nozzle 18. The slurried polymer particle is sprayed into spray chamber 19. A heated atomizing gas may be fed through line 20 into nozzle 18, for example entering chamber 19 through an orifice in the nozzle 18 concentric about the slurry orifice. The atomizing gas for a two fluid nozzle is maintained below 90° C temperature to keep the polymer from redissolving and to keep the solvent from boiling too rapidly. The drying gas may be heated to a temperature in the range of 80° to 160° C. adjusted for the solvent, and degree of dryness desired in the powders leaving the spray chamber 19 through conduit 23, which may be a gravity flow, conveyor, screw, pneumatic or the like. The atomizing and drying gas is recovered and sent to cyclone 21 via line 22, where polymer fines are removed and returned via 24 into line 23. The recovered gas containing vaporized solvent is passed to scrubber/condenser 25 via line 33, wherein the solvent is recovered and returned via 26 to the solvent feed tank (not shown) for recycle or is otherwise employed. The recovered atomizing gas passes through line 27 through heater 29 and hence is recycled into the spray chamber 19.

The damp powder from spray chamber 19 and cyclone 21 passes to a dryer 28, such as a fluidized bed where the remaining solvent is removed via line 30 to pass through cyclone 21 with the fines returning to dryer 28 via line 24 and vaporized solvent going to condenser 25.

The dried polymer powder goes via line 31 to classifier 32 where various sizes are separate for different utilizations.

The drying gas may be conveniently passed into the spray chamber by a disperser concentric with the centrifugal or pressure atomizer. The drying gas and powder are generally allowed to flow concurrently to the dryer outlet so that the slurry sees the hottest and dryest gases initially. The powder flow may be adjusted to be spiral and produce longer residence times in the spray chamber.

Generally the slurry if atomized through the nozzle under pressures of 5 to 50 psig. but pressures just above that of the drying atmosphere are necessary for centifugal atomization. The drying gas is fed at sufficient rates to not result in equilibrium limitations to drying. However the rates must also be adjusted to provide suitable residence time. The temperature of the drying gas and the rates of feed of the materials are preferably adjusted to produce a temperature in the vaporization zone, i.e., the spray chamber in the range of 30° to 80° C. but certainly not so high as to soften the polymer particles and induce agglomeration.

As noted above substantially all of the particles are less than 75 microns in size. The average particle size according to the present process will be around 20 microns and the particles will be substantially spherical, except as noted above in regard to the agglomerated material. The particles of this invention are predominately of a size suitable for electrostatically sprayed coating, e.g., a range of about 5-60 microns.

The details of the solution and precipitation vessel 106 are shown in FIG. 2. Two turbine blades were employed, with the upper turbine having flat blades 101 attached to hub 111 and the lower turbine having blades 102 attached to hub 112 at a 45° downward thrust. Two baffles 103 and 104 are situated at 180° from each other. The heat exchanger 105 is a helical coil through which either a heating or cooling fluid may be passed depending on the sequence. The heat exchanger is spaced away from the baffles by members 109 to allow free flow of the materials around the coils without clogging by the precipitated polymer. The jacket of the vessel may also be heated and cooled for extra heat transfer area. Similarly the baffles are spaced away from the vessel jacket 107 by members 110 to prevent polymer building up on the baffles.

The power used to rotate shaft 108 is typically 0.5 to 10 horse power per 1,000 gallons of material to be agitated. This is qualitatively defined as "intense" agitation. The shear is high, due both to the intense agitation and the turbine impellers which exhibit intense shear. Thus the problem observed in the prior art attributing the production of polymer strings to shearing, is overcome by intensifying the degree of shear to a very high degree, short of emulsification.

The terms defining agitation and shear are qualitative but nonetheless, do provide those of skill in the art with information to carry out the present invention when coupled with the conditions of operation. The optimum results of the present process are obtained at 250 to 300 rpm.

EXAMPLE 1-4

In these examples acrylic acid modified (variable acrylic acid content by weight) polyethylene, polyethylene and EVA were dissolved in heptane under autogenous pressure at about 120° C and cooled to about 55° C under conditions of high shear agitation.

The slurry was sprayed through a Niro centrifugal atomizer having the drying gas entering the spray chamber through a disperser concentric about the atomization wheel through which the slurry is atomized. Spherical particles of which 99% were smaller than 75 microns were recovered. The conditions of atomizing and the spray chamber are set out in the Table below.

TABLE

| | Slurry | | | Drying Gas (Nitrogen) | | | | |
|---|---|---|---|---|---|---|---|---|
| Example | Type | Feed Rate | Temp. °C | Rate cfm | Inlet Temp °C | Outlet Temp. °C | Powder Volatiles % | Product Powder kg/hr |
| 1 | 11% [polyethylene modified with ~4% acrylic acid] in heptane | 1 lb/min | 55 | 40 | 120 | 40 | 1 | 3.4 |
| 2 | 18% [ethylenevinylacetate (5.6% vinylacetate) modified with ~4 % acrylic acid] in heptane | 0.5 lb/min | 55 | 40 | 130 | 40 | 1 | 3.4 |
| 3 | 9% [polypropylene modified with ~6% acrylic acid] in heptane | 1.5 lb/min | 55 | 40 | 120 | 45 | 20 | 2.2 |
| 4 | 9% [ethylene/vinyl acetate (5.6 vinyl | 0.5 lb/min. | 55 | 40 | 130 | 40 | 5.5 | 1.8* |

TABLE-continued

| | Slurry | | | Drying Gas (Nitrogen) | | | | |
|---|---|---|---|---|---|---|---|---|
| Example | Type | Feed Rate | Temp. °C | Rate cfm | Inlet Temp °C | Outlet Temp. °C | Powder Volatiles % | Product Powder kg/hr |
| | acetate) (MI 25)] in heptane | | | | | | | |

*99 + % finer than 74 microns without attrition

The process was also applied to ethylene vinyl acetate copolymer, ethylene vinyl acetate-acrylic acid copolymer, polyethylene, polypropylene, and a blend of polyethylene and ethylenevinyl acetate-acrylic acid terpolymer. Each polymer was generally employed as described above and materials were produced in the MI range of from 0.5 to 40 with 99 + % of the powder of less than 74 microns and the average particle size of about 20 microns as collected from the spray drier. The powders did not require any dusting powders such as fumed silica for handling. The powders remained handleable after packing. Bulk density was about 0.45 grams/cc for the ethylene polymers and 0.3 grams/cc for the propylene resins.

Polyethylene modified with 0.28% himic anhydride graft was also prepared in fine powder form as well as a polyethylene - 0.29% himic anhydride graft that had been esterfied with anethylene glycol ester and a polyethylene - 2% glycidyl acrylate copolymer.

The invention claimed is:

1. A process for preparing powders of thermoplastic polymers comprising
    dissolving 1 to 40 weight percent of thermoplastic polymer in a solvent of paraffin or cycloparaffin hydrocarbons having 5 to 12 carbon atoms at a temperature greater than 100° C up to about 165° C under autogenous conditions,
    cooling said solution under autogenous conditions to a temperature less than 90° C,
    subjecting said solution during said cooling to high shear agitation to produce particulate polymer, said high shear agitation being characterized by turbine agitators in a vessel being ⅓ to ⅔ the diameter of the vessel operated at from 20 to 300 rpm's and being rotated with 0.5 to 10 horse power per 1000 gallons of material agitated, short of emulsification to produce particulate polymer,
    precipitating said thermoplastic polymer during said cooling and high shear agitation,
    recovering a slurry of polymer particles and solvent,
    atomizing said slurry into a vaporization zone, feeding a drying gas at a temperature in the range of 80 to 180° C into said vaporization zone and
    recovering particulate polymer product having a substantial amount of said solvent removed therefrom.

2. The process according to claim 1 wherein the temperature of said solution is adjusted to maintain an autogenous pressure of less than 100 psig.

3. The process according to claim 2 wherein said autogenous pressure is maintained at less than 50 psig.

4. The process according to claim 1 wherein said solvent is n-pentane, isopentane, isooctane, cyclohexane, methylcyclohexane, heptane, nonane or mixtures thereof.

5. The process according to claim 1 wherein the solvent is n-heptane.

6. The process according to claim 1 wherein the temperature of the drying gas is adjusted to maintain the temperature in the vaporization zone in the range of 30° to 80° C.

7. The process according to claim 6 wherein the drying gas has a temperature in the range of 90° to 160° C.

8. The process according to claim 6 wherein the drying gas is an inert gas.

9. The process according to claim 8 wherein the drying gas is nitrogen.

10. The process according to claim 1 wherein at least 5 weight % of said polymer is dissolved in said solvent.

11. The process according to claim 10 wherein said precipitating is continued until the amount of thermoplastic left in solution produces a viscosity in the solvent no greater than 5 centipoise at the temperature of atomization.

12. The process according to claim 1 wherein said recovered particulate polymer is dried to produce a powder, having substantially all of the particles thereof less than 100 microns.

13. The process according to claim 1 wherein said slurry is atomized through a centrifugal atomizer.

14. A process for preparing fine free flowing powders of thermoplastic polymers comprising
    dissolving 5 to 20 weight % of said thermoplastic resin in a solvent of paraffin or cycloparaffin hydrocarbons having 5 to 12 carbon atoms at temperatures in the range of 100° to 140° C under autogenous pressure,
    cooling said solution under autogenous pressure to a temperature of below 90° C,
    intensely agitating said cooling solution to provide high shear conditions therein, said high shear agitation being characterized by turbine agitators in a vessel being ⅓ to ⅔ the diameter of the vessel operated at from 20 to 300 rpm's and being rotated with 0.5 to 10 gallons of material agitated, short of emulsification to produce particulate polymer,
    continuing said cooling to a temperature and for a sufficient period of time to precipitate said polymer and to leave less than the amount of said polymer in solution which will inhibit formation of droplets during atomization and drying,
    recovering a slurry of particulate polymer and solvent,
    atomizing said slurry through an atomizer into a vaporization zone,
    adding drying gas to said vaporization zone at a temperature in the range of 90° to 160° C and at a rate to maintain the temperature of said vaporization zone in the range of 30° to 80° C,
    recovering a partially dry particulate polymer material from said vaporization zone,
    drying said partially dry particulate polymer material and recovering a powder, wherein said solvent has a vapor pressure of 50 to 400 mm of mercury at the temperature of said vaporization zone and said amount of polymer in solution is that amount which produces a viscosity in said solvent of no greater than 5 centipoise at the temperature of atomization.

15. The process according to claim 14 wherein the polymer comprises grafted polyolefins.

16. The process according to claim 15 wherein the said grafted polyolefin is acrylic acid grafted.

17. The process according to claim 15 wherein the said grafted polyolefin is glycidyl acrylate grafted.

18. A process for preparing powders of thermoplastic polymer comprising dissolving 1 to 40 weight percent of thermoplastic polymer in a solvent of paraffin or cycloparaffin hydrocarbons having 5 to 12 carbon atoms at a temperature greater than 100° C up to about 165° C under autogenous conditions, cooling said solution under autogenous conditions to a temperature less than 90° C, subjecting said solution during said cooling to high shear agitation, precipitating said thermoplastic polymer during said cooling and high shear agitation, said high shear agitation being characterized by turbine agitators in a vessel being ⅓ to ⅔ the diameter of the vessel, operated at from 200 to 300 rpm's and being rotated with 0.5 to 10 horse power per 1000 gallons of material agitated, short of emulsification to produce particulate polymer, recovering a slurry of polymer particles and solvent, atomizing said slurry into a vaporization zone, feeding a drying gas at a temperature in the range of 80 to 180° C into said vaporization zone, and recovering particulate polymer product having a substantial amount of said solvent removed therefrom.

* * * * *